US006233457B1

(12) United States Patent
Wiehe

(10) Patent No.: US 6,233,457 B1
(45) Date of Patent: May 15, 2001

(54) METHOD AND MOBILE COMMUNICATION SYSTEM FOR ROUTING OF CALL CONNECTIONS

(75) Inventor: Ulrich Wiehe, Bad Hersfeld (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/101,750

(22) PCT Filed: Oct. 16, 1997

(86) PCT No.: PCT/DE97/02378

§ 371 Date: Jul. 15, 1998

§ 102(e) Date: Jul. 15, 1998

(87) PCT Pub. No.: WO98/23117

PCT Pub. Date: May 28, 1998

(30) Foreign Application Priority Data

Nov. 18, 1996 (DE) .............................................. 196 47 627

(51) Int. Cl.[7] .................................................. H04Q 7/20
(52) U.S. Cl. .......................... 455/445; 455/422; 455/432; 455/433
(58) Field of Search .................................... 455/422, 432, 455/433, 436, 445, 456, 461, 560, 561

(56) References Cited

U.S. PATENT DOCUMENTS

| 5,621,783 | * | 4/1997 | Lantto et al. | 455/433 |
| 5,819,178 | * | 10/1998 | Cropper | 455/433 |
| 5,890,063 | * | 3/1999 | Mills | 455/433 |
| 5,943,620 | * | 8/1999 | Boltz et al. | 455/445 |
| 5,950,126 | * | 9/1999 | Palviainen et al. | 455/445 |
| 5,953,651 | * | 9/1999 | Lu et al. | 455/445 |
| 5,978,678 | * | 11/1999 | Houde et al. | 455/433 |
| 5,978,681 | * | 11/1999 | Bertacchi | 455/445 |
| 5,991,621 | * | 11/1999 | Aplerovich | 455/433 |

FOREIGN PATENT DOCUMENTS 0 675 663 A2   4/1995 (EP).
WO 96/20574    4/1996 (WO).

OTHER PUBLICATIONS

ETSI STC SMG3/WPC, Helsinki, Sep. 2–6, 1996, Siemens, "Optimisation of OR–interrogation", pp. 1–7, plus drawing pages.
GSM–Empfehlung 03.79, Version 0.9.0 vom 31.07. 1996, ETSI, European digital cellular telecommunications system, Support of Optimal Routeing (SOR) Technical Realisation, approximately 32 double sided pages.

* cited by examiner

Primary Examiner—Nay Maung
(74) Attorney, Agent, or Firm—Hill & Simpson

(57) ABSTRACT

A switching-oriented signaling load between a switching center (VMSCA) that receives a request for the connection setup and an access mobile switching center (GMSCA) that initiates optimized routing in inter-network fashion that is lower compared to the known method is achieved. The access mobile switching center (GMSCA) enters a destination address (AVMSC) offered by the home network (HPLMN) of a called radiotelephone subscriber (B-MS) or a destination address (AB') offered by a visited mobile switching center (VMSCB) given call redirection into a message (ANM) that signals the creation of the call connection. It sends the message to the switching center (VMSCA) in order to be interpreted thereat for charging for the call connection. The assigning of a reference number by the originating switching center that implements the charging and the transmission of a separate MAP message (not call destination) by the access mobile switching center are thus no longer necessary. The insertion of the destination address into the message that reports creation of the call connection only after the setup of the call connection has an especially beneficial effect with respect to the switching-oriented signaling outlay when a call redirection is set for the called radiotelephone subscriber.

9 Claims, 1 Drawing Sheet

METHOD AND MOBILE COMMUNICATION SYSTEM FOR ROUTING OF CALL CONNECTIONS

BACKGROUND OF THE INVENTION

The invention is directed to methods and to a mobile communication system for routing of call connections given respective calls directed to a radiotelephone subscriber who is registered at least in his home network regardless of the momentary location.

A cellular mobile communication system such as, for example, that according to the GSM standard (global system for mobile communication) is constructed of a plurality of radio cells and offers the radiotelephone subscriber a maximum of mobility in the framework of the radio communication. The country-overlapping international mobile communication system according to the GSM standard comprises a radio-oriented sub-system for the setup and cleardown and for maintaining radio connections between mobile stations and base stations, a switching-oriented sub-system for the setup, administration and cleardown of connections, taking mobility-specific functions into consideration, as well as an administration and maintenance sub-system for monitoring operating conditions and for controlling the network components arranged distributed in the system. Included among the tasks of the switching-oriented sub-system are the administration of the subscriber data of the radiotelephone subscribers, finding the location of a called radiotelephone subscriber or, respectively, mobile station at any arbitrary location of the GSM coverage area, the connection setup and cleardown as well as the acquisition of the charge dat (charging) for calls that depart from the radiotelephone subscriber or, respectively, arrive at the radiotelephone subscriber.

For implementing the tasks, the switching-oriented system has mobile switching centers available to it that, in particular, assume the mobility-conditioned methods and functions in the setup and cleardown of connections and in the call handling during a connection within the mobile radiotelephone network and at the interfaces to other communication networks, and also has visitor registers and home registers available to it, whereof the visitor register temporarily contains the subscriber data of the radiotelephone subscribers located at the moment in the coverage area of an allocated mobile switching center, whereas the subscriber data of the radiotelephone subscribers are permanently administered in the home register.

According to GSM Recommendation 03.79, Version 0.9.0 of Jul. 31, 1996—see, in particular, FIG. 1 (architecture) and FIG. 3 (flowchart) as well as chapters 9.2.2 and 9.2.4—, an optimized routing of call connections can be supported. When the mobile switching center (VMSCA) of a network receives a request to set up a signaling connection because of a call directed to a radiotelephone subscriber (B-subscriber), a message for the connection setup is sent to an access mobile switching center (GMSCA) of the network. According to the optimized routing, the access mobile switching center (GMSCA) has the possibility of directing a message for location inquiry to the home network (HPLMNB) of the called radiotelephone subscriber. The purpose of the location inquiry lies in requesting information—including a destination address—with reference whereto the access mobile switching center can decide whether a direct connection can be set up to a visitor mobile switching center that, for example, is currently responsible for the called radiotelephone subscriber due to the latter's location.

According to said GSM Recommendation 03.79, it is thereby necessary to separately assign a reference number (call reference number) for the identification of the call in the originating mobile switching center, to transmit this to the access mobile switching center and store it thereat. After a check was carried out to see, among other things, whether nothing opposes a direct connection to the visitor mobile switching center for reasons of charging, it is also necessary to start a separate message (note call destination) with the access mobile switching center in which the reference number is returned to the originating mobile switching center together with a destination address. The originating mobile switching center assigns the destination address to a call with the assistance of the reference number, stores the destination address for the charging and releases the reference number for re-assignment to another call. When a call redirection is set for the called radiotelephone subscriber, the access mobile switching center sends the separate message (note call destination) again with a new destination address deriving from the cal redirection. The signaling of the destination address ensues according to the mobile radiotelephone-specific user part (MAP) of the central signaling system CCS7 and already begins with the arrival of the information offered by the home network that optimized routing can be implemented.

SUMMARY OF THE INVENTION

An object of the invention is to specify a method and a mobile communication system with which the signaling load given optimized routing of call connections can be reduced compared to the known method.

A lower switching-oriented signaling load between the switching center that receives a request for connection setup and an access mobile switching center that initiates optimized routing in inter-network fashion is achieved in that, after setup of a direct connection to a visitor mobile switching center, the access mobile switching center inserts a destination address offered by the home network of the called radiotelephone subscriber into a message that signals the creation of the call connection and returns this to the switching center in order to be interpreted thereat for charging the call connection. The assigning of a reference number by the switching center that must implement the charging and the transmission of the separate MAP message (note call destination) by the access mobile switching center are thus no longer necessary.

The insertion of the destination address into the message that informs about the creation of the call connection only after the setup of the call connection has an especially beneficial effect on the switching-oriented signaling outlay when a call redirection is set for the called radiotelephone subscriber. Due to the call redirection, the access mobile switching center—upon reception of a message that contains a new destination address—thereby sets up a connection to a switching center defined by the new destination address. Upon reception of the message that signals the creation of the call connection, the access mobile switching center inserts the new destination address into this message and returns it to the switching center that interprets it for charging the call connection. In this case, the signaling—differing from the known method—need not be implemented doubly between access mobile switching center and originating switching center, i.e. first due to the setup of the connection to the radiotelephone subscriber and subsequently due to the setup of the connection to the new destination defined by the call redirection, but only once, i.e. after the setup to the new destination due to the new destination address.

According to a development of the invention, the destination address in transmitted in an information field of the message that is provided for the entry of numerals. It is thereby advantageous when the destination address comprises at least one country code for the identification of the country in an inter-country cellular mobile radiotelephone network, and potentially additionally comprises a national code for the identification of the national network of the inter-country cellular mobile radiotelephone network.

It is advantageous when the call is initiated by a radiotelephone subscriber and the request for a connection setup is received by a mobile switching center of a mobile radiotelephone network. Alternatively thereto, the call can also be started by wire-bound network subscriber and the request for a connection setup can be received by a switching center of a wire-bound network.

It has proven beneficial to transmit the message for the connection setup that the switching center sends to an access mobile switching center and the message for signaling the creation of the call connection that the access mobile switching center returns to the switching center in a user part of the central signaling system CCS7.

The mobile communication system that effects a lower switching-oriented signaling load comprises a switching center that contains means for the reception of the message in which a request for the setup of a signaling connection is contained and contains means for the interpretation of a destination address for the charging of the call connection. Over and above this, the system is equipped with an access mobile switching center that comprises means for the inter-network transmission of a message to the home network of the called radiotelephone subscriber and means for the setup of a direct connection to a visitor mobile switching center. Further, it comprises means for the reception of a message that is sent by the visitor mobile switching center or by some other switching center given a call redirection set for the called radiotelephone subscriber and that signals the creation of the call connection. In particular, the access mobile switching center comprises means that are provided for the insertion of a destination address that is offered by the home network or a destination address that is offered by the visitor mobile switching center given call redirection into the message and comprises means for sending the destination address to the switching center.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED
EMBODIMENTS

Figure 1:
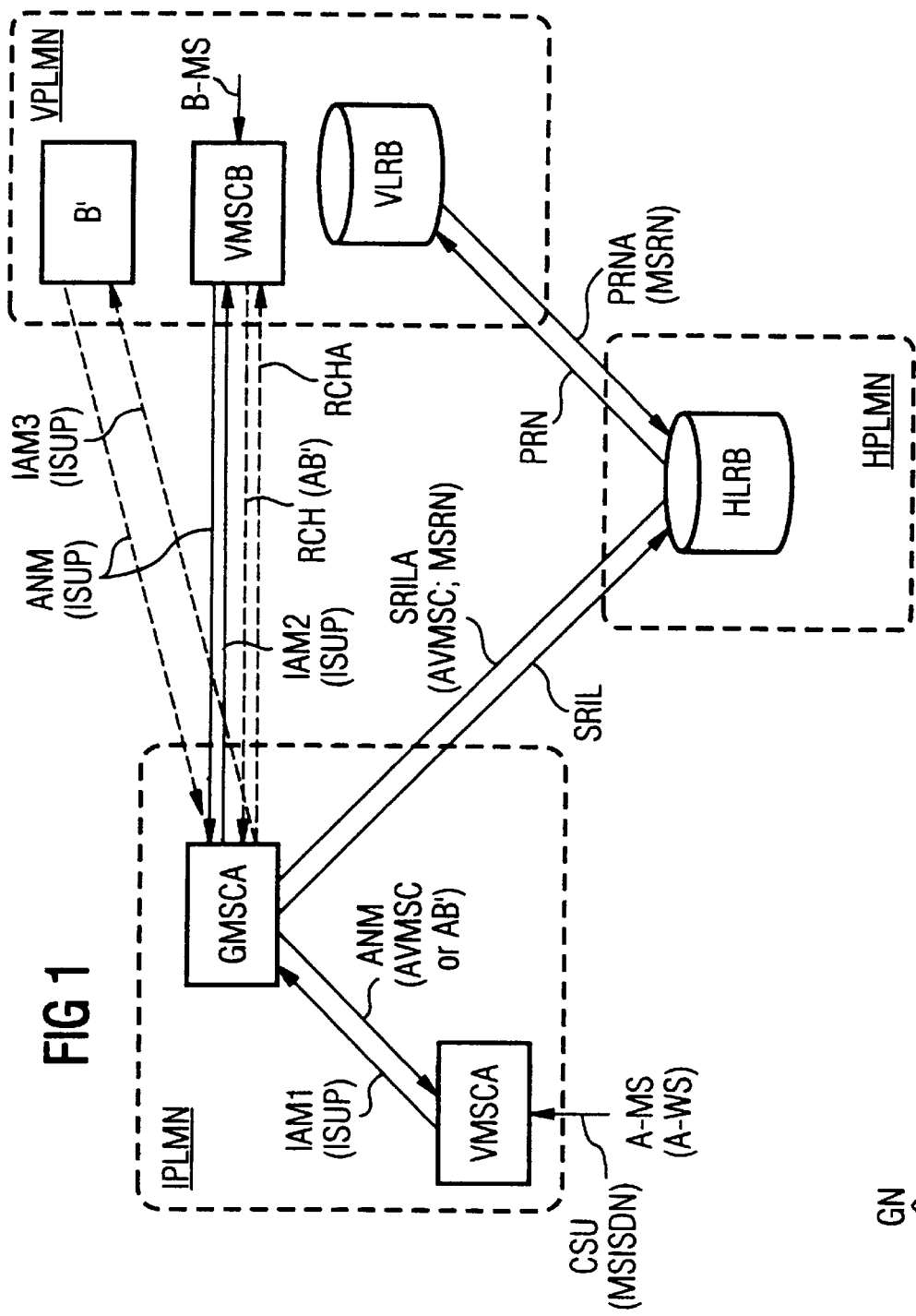
FIG. 1 a block circuit diagram of the message flow for routing a call connection given optimized routing across network boundaries.

The block circuit diagram in FIG. 1 shows the executive sequence for routing a call connection given a call directed to a radiotelephone subscriber with reference to the example of the inter-country cellular mobile radiotelephone network according to the GSM standard. Optimized routing is thereby supported. Let it be assumed in the present example that the call is initiated by an A-subscriber A-MS who is located in the competency area of a mobile switching center VMSCA of a network IPLMN and is directed to a B-radiotelephone subscriber B-MA who is located in the competency area of a mobile switching center VMSCB of a network VPLMN (mobile-to-mobile call). The call can likewise be directed to the B-radiotelephone subscriber B-MS by a wire-bound network A-subscriber A-WS. A switching center in a wire-bound network thereby assumes the routing of the call from the wire-bound network to the network IPLMN. The B-radiotelephone subscriber is registered with his subscriber data at least in a network HPLMN that represents his home network (home public land mobile network). Due to his momentary location, the B-radiotelephone subscriber B-MS is temporarily booked in a network VPLMN that represents his visitor network (visited public land mobile network). For the sake of simplicity, let it also be assumed that the networks IPLMN, HPLMN and VPLMN comprise an identical or at least similar network structure according to the structure of the inter-country international GSM mobile radiotelephone network but are operated in different countries by corresponding network operators. For example, let it thereby be assumed that the A-radiotelephone subscriber A-MS calls from a mobile radiotelephone network IPLMN in Germany and the B-radiotelephone subscriber B-MS is home-based in Switzerland but is registered as visitor in a mobile radiotelephone network VPLMN of Germany due to his current location.

In the network IPLMN, the block circuit diagram shows the mobile switching center VMSCA that, as originating mobile switching center, receives the call from the A-radiotelephone subscriber and shows an access mobile switching center GMSCA that is arranged at the interface to other networks. At least one home register in which the subscriber data of the B-radiotelephone subscriber are stored is located in the network HPLMN, whereas the network VPLMN comprises a visitor register VLRB in which subscriber data of the radiotelephone subscriber B-MS are stored for the duration of the residency in the competency area and comprises the mobile switching center VMSCB that, as visited mobile switching center, is responsible for the radiotelephone subscriber B-MS due to his location. Over and above this, a switching center B' can be involved in the call connection when a call redirection having a destination address that leads to the switching center B' is set for the called radiotelephone subscriber B-MS. According to the illustration in FIG. 1, the switching center B' lies in the same network VPLMN; however, it can also be located in a different network.

The A-radiotelephone subscriber selects the subscriber telephone number of the B-radiotelephone subscriber by inputting the number into a radiotelephone subscriber station (not shown). In response thereto, the radiotelephone station sends a message CSU (call setup) with which the setup of a signaling connection is requested. The message CSU is received by a base station system in the network IPLMN and is communicated to the mobile switching center VMSCA. The international radiotelephone subscriber telephone number MSISDN of the B-radiotelephone subscriber B-MS is contained in the message CSU. The mobile switching center VMSCA requests information for handling the outgoing call from a visitor register allocated to the mobile switching center. The visitor register acknowledges the request with an information that connections are allowed to be set up from and to the radiotelephone station of the calling radiotelephone subscriber A-MS. The mobile switching center VMSCA evaluates the subscriber telephone number MSISDN and, since this is a matter of a radiotelephone subscriber of a different network, sends a message IAM1 (initial address message) to the access mobile switching center GMSCA. According to the ISDN user part ISUP that is employed on the connecting lines between the mobile switching centers, the message IAM1 signals the central CCS7 signaling system. The reference number for the allocation to the respective call that is usually co-transmitted in the message IAM1 is thereby foregone.

When, as in the present case, the access mobile switching center GMSCA is located in a different network than the home register HLRB responsible for the B-radiotelephone subscriber B-MS, a message SRIL for location inquiry is sent from the access mobile switching center GMSCA into the home network HPLMN to the home register HLRB in inter-network fashion. The location inquiry (send location info) contains an indication that it is a matter of the request for a location information in support of optimized routing. The message transmission ensues according to mobile radiotelephone-specific user part (MAP) of the central CCS7 signaling system. Upon reception of the message SRIL, the home register HLRB checks whether the setup of a direct connection between the access mobile switching center GMSCA in the network IPLMN and the visited mobile switching center VMSCB in the network VPLMN can be implemented for reasons of charging for the call. This check is composed, for example, of a comparison of country codes that are allocated to the access mobile switching center GMSCA and to the visited mobile switching center VMSCB or to the home register HLRB. The charging requests are thereby defined such that no higher fees than for a call that is routed via the home network of the called radiotelephone subscriber as in a standard routing dare arise for a call that is handled according to optimized routing. The country code comparison represents only a simple measure for checking whether nothing stands in the way of a direct connection setup for reasons of charging for the call. More involved measures for supporting or rejecting optimized routing can be implemented without further ado in the home register HLRB itself or can also be relocated onto the access mobile switching center that starts the location inquiry. Given a relocation of more involved check measures onto the access mobile switching center, it is also possible to leave the simple check possibility on the basis of country code comparison at the respective home register.

In that the home register HLRB itself implements the country code comparison, a message PRN can be immediately sent to the visitor register VLRB in the network VPLMN given a positive comparison result. The message PRN (provide roaming number) usually serves for requesting a temporary location telephone number MSRN (mobile subscriber roaming number) that is assigned by the visitor register VLRB. Before the home register HLRB sends the message PRN according to the mobile radiotelephone-specific user part (MAP) to the visitor register VLRB, it previously determines—in order to be on the safe side— whether the visitor register VLRB supports optimized routing or not. When this is the case, the visitor register VLRB assigns a temporary location telephone number MSRN and returns it to the home register HLRB in a message PRNA.

When, as acknowledgment, the home register HLRB receives an information in the message PRNA that the B-radiotelephone subscriber B-MS can be reached, a message SRILA is generated and returned to the access mobile switching center GMSCA as acknowledgment for the location inquiry SRIL. The message SRILA thereby contains at least a destination address AVSMC that is preferably an information for the identification of the visited mobile switching center VMSCB affected by the optimized routing. When the home register HLRB receives a temporary location telephone number MSRN from the visitor register, the offered location telephone number MSRN is additionally transmitted to the access mobile radiotelephone switching center GMSCA in the message SRILA in addition to the destination address AVMSC.

On the basis of the location number MSRN that has arrived, the access mobile switching center GMSCA sees to the direct connection setup to the visited mobile switching center VMSCB. To that end, the access mobile switching center GMSCA sends a message IAM2 for the connection setup according to the ISDN user part ISUP to the mobile switching center. As soon as the called radiotelephone subscriber B-MS activates his radiotelephone subscriber station and the call connection is thus created, this is signaled to the access mobile switching center GMSCA with the message ANM. The message ANM is received via the base station network in the network VPLMN and is sent to the mobile switching center VMSCB before it is likewise transmitted according to the ISDN user part ISUP to the access mobile switching center GMSCA. After arrival of the message ANM, the access mobile switching center GMSCA inserts the destination address AVMSC into the message ANM and transmits it to the originating mobile switching center VMSCA of the network IPLMN or to the switching center of the wire-bound network according to the ISDN user part ISUP, where it is utilized for charging for the call connection. The separate message (note call destination) with the respective reference number accepted in the mobile radiotelephone-specific user part (MAP) of the central signaling system CCS7 is thus superfluous. The message ANM is used instead, one having to wait for this anyway before the charging of the call connection by the originating mobile switching center VMSCA or the switching center in the wire-bound network. The message ANM contains an information about which call is to be charged according to the optimized route.

When a call redirecting is set, for example when the B-radiotelephone subscriber B-MS does not answer after a specific time has elapsed, the mobile switching center VMSCB sends a message RCH (resume call handling) to the access mobile switching center GMSCA. The message RCH contains a new destination address AB' that the switching center B' defines as destination location of the call redirection. The message RCH arriving from the mobile switching center VMSCB is acknowledged by the access mobile switching center GMSCA with an acknowledge message RCHA. The access mobile switching center GMSCA interprets the destination address AB' that has arrived and that, for example, can be composed of a subscriber telephone number and starts a direct connection setup to the switching center B' that, for example, lies in a wire-bound network. To that end, the access mobile switching center GMSCA sends a message IAM3 for the connection setup to the switching center B' according to the ISDN user part ISUP. As soon as the called radiotelephone subscriber B-MS activates the telephone subscriber station to which the redirection was undertaken in the wire-bound network, and, thus, the call connection has been created, this is signaled to the access mobile switching center GMSCA with the message ANM. The message ANM is received via the wire-bound network and is signaled to the switching center B' before it is likewise transmitted according to the ISDN user part ISUP to the access mobile switching center GMSCA. After the arrival of the message ANM, the access mobile switching center GMSCA inserts the new destination address AB' into the message ANM and transmits it to the originating mobile switching center VMSCA of the network IPLMN or to the switching center of the wire-bound network according to the ISDN user part ISUP where it is utilized for charging the call connection.

The message ANM with the destination address AVMSC or AB' is sent only once as soon as the call connection is in place, i.e. a double transmission of the separate message that is respectively only sent for the purpose of the allocation to the destination address to the respective call on the basis of the reference number before the direct call connection is created is not required—as in the known method—even in the case of call redirection.

As a result of the invention, the direct connection for supporting the optimized routing between mobile switching centers of various networks can be set up given a call directed to a B-radiotelephone subscriber, and a reduced switching-oriented signaling load between the network equipment can thereby be achieved compared to the known method by employing the message ANM. The reduction of the signaling load is based on foregoing reference number and the storing thereof in the respective mobile switching centers and on foregoing the separate message for the return transmission of the reference number, which is required in the known method for implementing the charging for the respective call connection.

Figure 2:
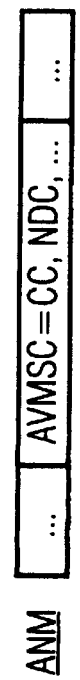
FIG. 2 the structure of the message for signaling the creation of the call connection into which the destination address of the call connection is entered.

FIG. 2 shows the structure of the message ANM with which the creation of the call connection given optimized routing is signaled. The message includes an information field GN (generic number) into which numbers can be entered. The destination address AVMSC offered by the home network or the destination address (AB' ) offered given call redirection is therefore preferably written into this information field GN by the access mobile switching center that initiated the optimized routing. The destination address comprises at least one country code CC (country code) for identifying the country in the inter-country cellular mobile radiotelephone network according to the GSM standard, and preferably also additionally contains a national code NDC (national destination code) for identifying the national network of the inter-country cellular mobile radiotelephone network. Additional parameters such as parts of the radiotelephone subscriber telephone number that, for example, define its home register can also be additionally optionally contained in the destination address under certain circumstances.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for routing call connections given respective calls directed to a called radiotelephone subscriber who is registered at least in his home network regardless of momentary location, comprising the steps of:

receiving a first message, that contains a request to set up a signaling connection and information identifying the called radiotelephone subscriber, by a first switching center in a first network;

sending a second message for a connection setup from the first switching center to an access mobile switching center based on the information of the called radiotelephone subscriber;

sending a third message for location inquiry with which the support of an optimized routing wherein a direct connection can be set up from the access mobile switching center to a visited mobile switching center from the access mobile switching center to the home network of the called radiotelephone subscriber in an internetwork manner;

providing by the home network a destination address and sending the destination address in a fourth message to the access mobile switching center in inter-network manner, the access mobile switching center setting up the direct connection to the visited mobile switching center; and upon receipt of a fifth message that signals creation of the call connection, inserting via the access mobile switching center the destination address into the fifth message and returning the fifth message to the first switching center, which interprets the destination address for charging for the call connection.

2. The method according to claim 1, wherein given a call redirection set for the called radiotelephone subscriber, the access mobile switching center, upon reception of a further message that contains a new destination address, sets up a connection to a further switching center defined by the new destination address; and wherein the access mobile switching center, upon reception of the fifth message that signals the creation of the call connection, inserts the new destination address into the fifth message and returns the further message to the fifth switching center, which interprets the new destination address for charging for the call connection.

3. The method according to claim 1, wherein the destination address is entered into an information field of the fifth message that is used for acceptance of numerals.

4. The method according to claim 1, wherein the destination address has at least a country code with which a country of an inter-country, cellular mobile radiotelephone network can be identified.

5. The method according to claim 4, wherein the destination address additionally has a national code with which a national network of the inter-country, cellular mobile radiotelephone network can be identified.

6. The method according to claim 1, wherein the call is initiated by a first radiotelephone subscriber and a mobile switching center of a mobile radiotelephone network, as the first switching center, receives the message with which the setup of the signaling connection is requested.

7. The method according to claim 1, wherein the call is initiated by a wire-bound network subscriber have a switching center and wherein the switching center of a wire-bound network receives the message with which the setup of the signaling connection is requested.

8. The method according to claim 1, wherein the second message for the call setup, which is sent from the first switching center to the access mobile switching center, and the fifth message for signaling the creation of the call connection, which is returned from the access mobile switching center to the first switching center, are transmitted according to a user part of a central signaling system.

9. A mobile communication system for routing call connections given respective calls directed to a called radiotelephone subscriber who is registered at least in his home network regardless of momentary location, comprising:

a first switching center
   having means for receiving a first message in which a request for setup of a signaling connection and information identifying the called radiotelephone subscriber are contained, and
   having means for sending a second message for a connection setup based on the information of the called radiotelephone subscriber to an access mobile switching center, and
   having means for interpreting a destination address for charging for the call connection; and the access mobile switching center
   having means for inter-network transmission of a third message for a location inquiry to the home network of the called radiotelephone subscriber and means for setup of a direct connection to a visited mobile switching center;
   having means for receiving a message that is sent from the visited mobile switching center or, when call redirection is set for the called radiotelephone subscriber, from another switching center and that signals creation of the call connection; and
   having means for inserting one of a destination address that is offered by the home network or a destination address that is offered by the visited mobile switching center given call redirection into the connection message, and means for sending the destination address to the first switching center.

* * * * *